United States Patent
Barthelmess et al.

(10) Patent No.: US 11,433,621 B2
(45) Date of Patent: Sep. 6, 2022

(54) HEAT-PRESS SYSTEM FOR FOOTWEAR OR APPAREL

(71) Applicant: adidas AG, Herzogenaurach (DE)

(72) Inventors: Bernd Barthelmess, Rosstal (DE); Stefan Egerer, Puschendorf (DE); Patrick Mergenthaler, Markt Bibart (DE)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 16/567,510

(22) Filed: Sep. 11, 2019

(65) Prior Publication Data

US 2020/0101674 A1  Apr. 2, 2020

(30) Foreign Application Priority Data

Sep. 27, 2018 (DE) .......................... 102018216601.3

(51) Int. Cl.
| | | |
|---|---|---|
| *B29C 65/48* | (2006.01) | |
| *A41D 27/24* | (2006.01) | |
| *B29C 65/18* | (2006.01) | |
| *B30B 3/00* | (2006.01) | |
| *B29D 35/00* | (2010.01) | |

(52) U.S. Cl.
CPC ........ *B29C 65/4815* (2013.01); *A41D 27/245* (2013.01); *B29C 65/18* (2013.01); *B29D 35/0054* (2013.01); *B30B 3/005* (2013.01)

(58) Field of Classification Search
None
See application file for complete search history.

(56) References Cited

U.S. PATENT DOCUMENTS

| | | | | |
|---|---|---|---|---|
| 1,471,588 A | | 10/1923 | Bourn | |
| 1,592,975 A | * | 7/1926 | Hearne | H05B 3/0095 219/244 |
| 1,880,804 A | * | 10/1932 | Christiansen | A43D 43/06 12/59.5 |
| 2,002,452 A | * | 5/1935 | Hartt | A43D 43/06 12/55 |
| 2,018,867 A | * | 10/1935 | O'Donnell | A43D 43/06 12/55 |
| 2,080,712 A | * | 5/1937 | Hartt | A43D 43/06 12/55 |

(Continued)

FOREIGN PATENT DOCUMENTS

| | | |
|---|---|---|
| CA | 2055451 | 9/1991 |
| CN | 1057810 | 1/1992 |

(Continued)

OTHER PUBLICATIONS

European Patent Application No. 19196612.6, European Search Report dated Mar. 5, 2020, 8 pages.

(Continued)

*Primary Examiner* — Adam J Eiseman
*Assistant Examiner* — P Derek Pressley
(74) *Attorney, Agent, or Firm* — Kilpatrick Townsend & Stockton LLP

(57) ABSTRACT

A heat-press system for use in the production of footwear or apparel can include at least a hollow first roll comprising an external surface and an internal surface. The internal surface can define a core. The core can include a first heating element.

16 Claims, 6 Drawing Sheets

(56) References Cited

U.S. PATENT DOCUMENTS

| | | | | |
|---|---|---|---|---|
| 2,697,473 | A | * | 12/1954 | Techtmann ............ B29C 65/18 156/498 |
| 2,749,966 | A | | 6/1956 | Roetger |
| 2,751,966 | A | * | 6/1956 | Techtmann ............ B29C 66/80 156/574 |
| 3,153,607 | A | * | 10/1964 | Ambler ................. B29C 53/48 156/203 |
| 3,413,178 | A | | 11/1968 | Langevin |
| 3,738,082 | A | * | 6/1973 | Anderson ........ B29C 66/53461 53/329.4 |
| 4,737,212 | A | | 4/1988 | Emrich et al. |
| 2002/0095127 | A1 | | 7/2002 | Fish et al. |
| 2003/0010439 | A1 | * | 1/2003 | Fenton ................. A41D 27/245 156/304.3 |

FOREIGN PATENT DOCUMENTS

| | | |
|---|---|---|
| CN | 1681643 | 10/2005 |
| CN | 202491432 | 10/2012 |
| CN | 103085439 | 5/2013 |
| CN | 106163311 | 11/2016 |
| CN | 107415328 | 12/2017 |
| CN | 207310560 | 5/2018 |
| GB | 460038 | 1/1937 |
| GB | 860916 | 2/1961 |
| GB | 1049522 | 11/1966 |
| WO | 0216125 | 2/2002 |
| WO | 03008181 | 1/2003 |
| WO | 2007122661 | 11/2007 |
| WO | 2009027701 | 3/2009 |

OTHER PUBLICATIONS

German Patent Application No. 102018216601.3, Office Action dated May 6, 2019, 17 pages (includes English machine translation.
Chinese Application No. 201910915987.2, Office Action dated Apr. 8, 2021, 20 pages (English machine translation submitted).
Chinese Patent Application No. 201910915987.2 , Office Action, dated Nov. 26, 2021, 20 pages (English machine translation provided).
German Patent Application No. 102018216601.3, Office Action dated Jan. 25, 2022, 12 pages (English machine translation provided).
Chinese Application No. CN201910915987.2, Notification to Grant Patent, dated Apr. 1, 2022, 3 pages (2 pages of English translation, 1 page of original document).
European Application No. EP19196612.6, Office Action, dated Apr. 22, 2022, 6 pages.

* cited by examiner

HEAT-PRESS SYSTEM FOR FOOTWEAR OR APPAREL

CROSS REFERENCE TO RELATED APPLICATION

This application is related to and claims priority benefits from German Patent Application No. DE 10 2018 216 601.3, filed on Sep. 27, 2018, entitled "HEAT-PRESS SYSTEM" ("the '601 application"). The '601 application is hereby incorporated herein in its entirety by this reference.

FIELD OF THE INVENTION

The present invention relates to a heat-press system for the production of footwear or apparel, and methods for producing footwear or apparel.

BACKGROUND

In the production of fabric for footwear or apparel, the act of sealing a cutting edge may frequently be performed to prevent fraying or tearing. Presently, this involves a process in which a hotmelt is applied to the fabric in a first step, exposed to heat in a second step, and subjected to pressure in a third step. In other words, presently there are at least three separate steps involved for sealing a fabric with hotmelt. It is therefore an object underlying the present disclosure, to provide a method and apparatus to reduce the number of steps involved for sealing a fabric. A reduced number of steps reduces the complexity of the method and may reduce the time for production and thus the cost of an item of apparel or footwear.

Moreover, since the application of heat and pressure are presently separate steps, there is a risk that the softened hotmelt becomes misaligned after being exposed to heat and prior to being subjected to pressure. Therefore, a reduction in the number of process steps may also reduce the risk of misalignment and thus the amount of fabric that has to be discarded due to production faults.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, provided may be a heat-press system for use in the production of footwear or apparel. The heat-press system may include: a hollow first roll including an external surface and an internal surface; a core defined by the internal surface where the core includes a first heating element.

In some embodiments, the heat-press system further includes an abutting surface configured to form a compression zone with the external surface of the first roll for compressing a fabric for an article footwear or apparel.

In some embodiments, at least one of the external surface of the first roll or the abutting surface is coupled to a spring or a biasing mechanism.

In some embodiments, the heat-press system further includes a second roll, where the second roll includes an external surface, and where the external surface forms the abutting surface of the heat press system.

In some embodiments, the second roll further includes a second internal surface, the second internal surface defining a second core, the second core including a second heating element.

In some embodiments, the heat-press system further includes at least one motor configured to rotate at least one of the first roll about a first axis or the second roll about a second axis.

In some embodiments, at least one of the first roll or the abutting surface includes a projection.

In some embodiments, the other one of the first roll and the abutting surface includes a groove.

In some embodiments, the projection is configured to be inserted into the groove when the first roll and the abutting surface abut.

In some embodiments, the heat-press system further includes a guiding mechanism to guide a fabric for a piece of footwear or apparel toward the compression zone located between the first roll and the abutting surface.

In some embodiments, the guiding mechanism includes a third heating element.

In some embodiments, the guiding mechanism includes a first guiding surface and a second guiding surface arranged in a v-shaped configuration.

In some embodiments, the heat-press system further includes at least one control unit to control the temperature of at least one heating element of the heat-press system.

In some embodiments, the heat-press system is configured for sealing an edge of a fabric.

In some embodiments, sealing the edge of the fabric includes the use of a hotmelt, a ribbon, or a seam tape.

According to certain embodiments of the present invention, provided may be a method of treating a fabric for an article of footwear or apparel. The method can include preparing the fabric by at least one of applying a bonding agent, which melts or softens upon application of heat, to the fabric, or incorporating a meltable yarn into the fabric. The method can also include feeding the fabric into a heat-press system including at least a hollow first roll including an external surface and an internal surface, the internal surface defining a core, where the core includes a first heating element.

In some embodiments, the feeding includes: heating at least a first portion of the fabric or of the bonding agent by heating at least one of the first heating element, a second heating element in a hollow second roll, or a third heating element in a guiding mechanism to guide the fabric toward a compression zone located between the first roll and an abutting surface. The feeding may further include compressing at least a second portion of the fabric in the compression zone.

In some embodiments, the bonding agent or the meltable yarn includes a thermoplastic polymer.

In some embodiments, the bonding agent has a shape of a seam tape, a ribbon or a film.

In some embodiments, the bonding agent is applied to an edge of the fabric.

In some embodiments, the fabric is for an upper of an article of footwear.

According to certain embodiments of the present invention, an article of footwear or apparel is provided and includes a fabric produced by the method.

BRIEF DESCRIPTION OF THE DRAWINGS

In the following detailed description, embodiments of the invention are described referring to the following figures.

BRIEF DESCRIPTION

Figure 1A:
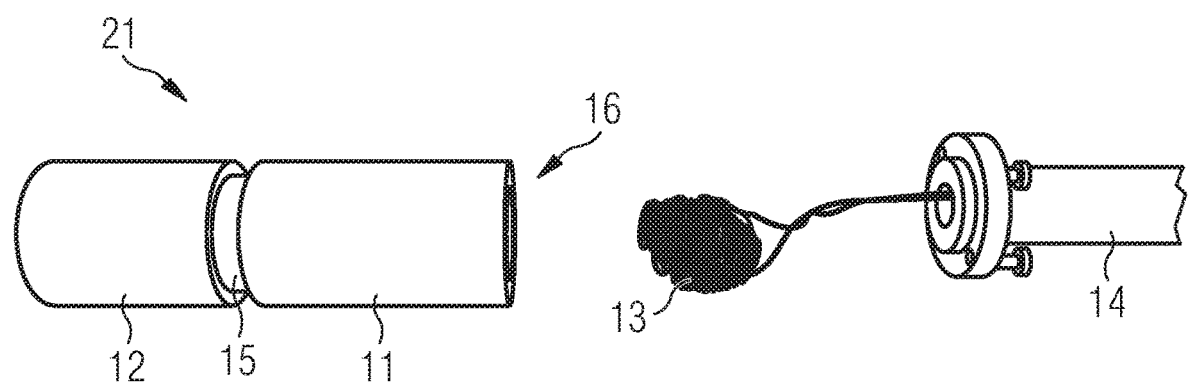
FIGS. 1A-C show a roll for a heat-press system according to some embodiments.

Some embodiments pertain to a heat-press system for use in the production of footwear or apparel. The heat-press system may include: at least a first hollow roll comprising an external surface and an internal surface, the internal surface defining a core, wherein the core comprises a first heating element.

The term "hollow" may mean that the empty, unfilled first roll itself is at least partly hollow, i.e. that it comprises a cavity or core, defined by an external surface and an internal surface of the first roll. The cavity or core does not have to extend a whole length of the first roll. The first core may extend over at least 50% of a length of the first roll or in some embodiments, at least 75%. This may enable a uniform transmission of heat from the core to the external surface. For example, the first core may be formed by a milling process, starting from a solid essentially cylindrical workpiece, e.g. a piece of metal, e.g. a rod.

However, the core comprises a first heating element which partially or entirely fills the core. It is also possible that additional elements are arranged in the core. In other words, the term hollow is not to be construed in such a way that it requires an empty core of the first roll or a core that comprises only the first heating element.

The first roll may, for example, be essentially cylindrical. The term "essentially cylindrical" is to be understood such that the external surface is cylindrical in a topological sense. The essentially cylindrical external surface may have a variable radius, due to manufacturing imperfections or to selectively compress certain regions of a fabric, of an article of footwear or apparel, more than others. The essentially cylindrical external surface may also comprise a texture, in order to impart a texture onto the fabric. A "fabric" in the present context may be any textile, for example, a weft-knitted textile, warp-knitted textile, a woven textile, a non-woven textile, a leather, etc.

The heat-press system allows the simultaneous application of heat and compression of the fabric for an article of apparel or footwear in a single process step, for example, for sealing a cutting edge of the fabric or for creating a reinforcement region of increased bending stiffness. Therefore, the number of steps involved is reduced compared with methods that employ an apparatus, e.g. a press, as known in the art, thus reducing the complexity. For example, a bonding agent may be applied to the fabric for the article of apparel or footwear, as described elsewhere herein. Alternatively, or additionally, the fabric may comprise a meltable yarn, that may have a melting temperature of less than 200° C., or in some embodiments, less than 150° C. Moreover, the risk of misalignment, for example of a hotmelt applied to the fabric, is reduced by combining the steps of heating and applying pressure.

The first roll may comprise a material with a thermal conductivity greater than 10 W/mK, or in some embodiments, greater than 50 W/mK, or in some embodiments, greater than 100 W/mK. It is to be understood that the thermal conductivity is to be measured using standard techniques at 273.15 K and at a pressure of 1 bar, also known as standard temperature and pressure (STP). Therefore, heat generated by the first heating element is conducted well from the first core to the external surface. Suitable materials for the first roll include, for example, stainless steel, copper, steel, aluminum, other metals, a polymer or plastic with the given thermal conductivity, combinations thereof, and other suitable materials. These materials have a desirable thermal conductivity and provide good abrasion resistance.

The first roll may further comprise a first thermometer. The first thermometer may be detachable to allow easy replacement of broken thermometers. The first thermometer could be any device suitable for measuring temperature on a relative or absolute scale by any suitable method. For example, a thermocouple would be suitable. The first thermometer therefore allows the temperature of the first roll to be determined, in order to allow selecting a temperature that is sufficiently high in order to melt the bonding agent and/or the meltable yarn, yet that is not too high, such that damage to the fabric may be prevented. The thermometer may be arranged between the heating element and the external surface to allow an accurate determination of the temperature.

The heating element may comprise a first electrically-conducting wire. This allows a safe and controllable generation of heat by Joule heating. For example, the first electrically-conducting wire may comprise a metal alloy comprising iron, nickel, chromium, copper, manganese, and/or cobalt. Such alloys have a high melting temperature and have a fairly constant specific electrical resistivity over a large temperature range, allowing a safe operation and easy control of the temperature. The term "electrically conducting" is understood in its usual sense, i.e. materials may be classified into electrical conductors, semiconductors, and electrical insulators.

The first roll may comprise a coil, which comprises the first electrically-conducting wire. To generate a suitable amount of heat, use may be made of a first electrically-conducting wire that has a length much greater than a longitudinal length of the first roll, in order to prevent overheating of the first electrically-conducting wire. Therefore, the first electrically-conducting wire may be arranged in the shape of a coil, in order to save space and to provide a sufficient dissipation of heat to the external surface.

The electrically-conducting wire may comprise an electrical insulation with a thermal conductivity greater than 5 W/mK. To ensure an effective application of heat by the first roll, the electrical insulation can comprise a thermal conductivity greater than 5 W/mK, or in some embodiments, 10 W/mK, or in some embodiments, 15 W/mK.

The electrical insulation may be applied as a coating to the electrically-conducting wire. It is also possible that the surface of the wire comprises an oxide, for example a magnesium oxide that serves as electrical insulation. This arrangement is particularly space-efficient. Alternatively, or additionally the electrical insulation may take up a substantial part of the volume of the core, for example at least 10%, or in some embodiments, at least 25%, or in some embodiments, at least 40%, for example as a filler, which fills essentially all available space in the first core. This may improve the thermal contact between the first heating element and the external surface. A first material may be used as a coating and a different second material used to create a strong thermal bond surrounding the insulated electrically-conducting wire.

The electrical insulation, i.e. the first and/or the second material, may comprise a ceramic, for example, porcelain, a glass, quartz, mica, chamotte, silica, alumina, and/or steatite. Any of these materials may be in the form of a powder, a solid, or a potting compound. In order to prevent a short circuit, the electrically-conducting wire may be electrically insulated. However, many electrical insulators are poor thermal conductors since poor electrical conductors tend to be poor thermal conductors and vice versa.

The electrical insulation may comprise a magnesium oxide. A magnesium oxide may allow a particularly high thermal conductivity, between 45 and 60 W/mK, therefore allowing a particularly good thermal contact between the first heating element and the external surface.

The external surface of the first roll may comprise a first circumferential indentation or a first circumferential projection. An indentation may be a groove. This may improve the alignment of a fabric and may prevent unintended lateral movement of the fabric during the procedure.

The heat-press system may further comprise an abutting surface configured to form a compression zone with the external surface of the first roll for compressing a fabric for an article footwear or apparel.

It is to be understood that an abutting surface does not need to make direct contact with the first roll. Typically, the fabric will be arranged at least partially between the first roll and the abutting surface in the compression zone.

It is to be understood that the presence of an abutting surface may be beneficial but is not essential for the operation of the heat-press system. For example, the heat-press system may be used to simultaneously apply heat and pressure to a fabric held under tension, without the presence of an abutting surface.

The external surface of the first roll and/or the abutting surface may be coupled to a biasing mechanism. A biasing mechanism, or suspension mechanism, may be biased, or pre-loaded. The coupling may be direct or may involve at least one intermediate element. For example, the first roll may be moveable over a sled, with the contact force adjusted by the biasing mechanism. The biasing mechanism allows the relative position of the first roll and the abutting surface to be controlled. Therefore, the force exerted by the external surface and the abutting surface on a fabric may be controlled. This is particularly useful, because it may mean that the heat-press system may be used for different thicknesses of fabric and/or bonding agent without requiring any adjustment. Moreover, too much force, or pressure, may damage the fabric, which may be prevented by the biasing mechanism.

The biasing mechanism may allow an essentially-linear displacement, and/or a rotary displacement.

The biasing mechanism may comprise a spring. A spring allows a simple and durable construction of a biasing mechanism, allowing both essentially-linear displacement as well as rotary displacement. A rubber pad and/or rubber shock may be used additionally and or alternatively, for example, for setting a desired compression force.

The heat-press system may further comprise a second roll. The second roll may comprise an external surface. The external surface may form the abutting surface of the heat press system. Using the first roll and the second roll may allow for particularly high production speeds. Alternatively, the abutting surface may be essentially flat.

The second roll may further comprise an internal surface, the internal surface defining a second core, the second core comprising a second heating element. It may be beneficial for a uniform application of heat, for the fabric and/or the bonding agent to be heated from both sides, i.e. by the first roll and the second roll.

Generally, the second roll may have similar or identical properties to the first roll as described herein.

At least one of the first roll and the abutting surface may comprise a projection. Only one of the first roll and the abutting surface may comprise a projection. Alternatively, both the first roll and the abutting surface may comprise a projection. A projection may be useful to prevent unintended slipping of the fabric during use of the heat-press system. It is not necessary for the other one of the first roll and the abutting surface to comprise a corresponding groove.

The other one of the first roll and the abutting surface may comprise a groove wherein the projection is configured to be inserted into the groove when the first roll and the abutting surface abut. In other words, the first roll may comprise a groove and the abutting surface, e.g. the second roll, may comprise a corresponding projection. Alternatively, the first roll may comprise a projection and the abutting surface, e.g. the second roll, may comprise a corresponding groove. Alternatively, the first roll may comprise a first projection and a second groove and the abutting surface, e.g. the second roll, may comprise a first groove corresponding to the first projection and a second projection corresponding to the second groove. Thus, the groove(s) may form a path for the fabric and/or the bonding agent to pass through. Therefore, this arrangement beneficially improves the alignment of the fabric and the bonding agent, especially before the fabric and/or the bonding agent solidifies.

The projection and/or the groove may be arranged circumferentially around the first and/or the second roll. This allows for a particularly simple and reliable processing.

The heat-press system may further comprise at least one motor, where the first roll is rotatable about a first axis and/or the second roll is rotatable about a second axis, by the motor. A single motor may be used to rotate the first roll and the second roll. Alternatively, a first motor may be used to rotate the first roll and a second motor may be used to rotate the second roll. A motor may be controlled precisely electronically and may be preferable compared with hand-operated rotation, in order to automate the process and prevent worker fatigue.

The heat-press system may further comprise a guiding mechanism to guide a fabric for a piece of footwear or apparel toward the compression zone located between the first roll and the abutting surface, e.g. the second roll.

The guiding mechanism, or feeder, may be used to ensure that a bonding agent is correctly aligned before being arranged on the fabric, for example on the edge of the fabric, and before the fabric, and bonding agent, if present, enter the compression zone.

The guiding mechanism may comprise a material with a thermal conductivity greater than 10 W/mK, or in some embodiments, greater than 50 W/mK, or in some embodiments, greater than 100 W/mK. Suitable materials include, for example, stainless steel, copper, steel, aluminium, and other metals. These materials have a desirable thermal conductivity and provide good abrasion resistance.

The guiding mechanism may comprise a third heating element. Therefore, the guiding mechanism may pre-heat the fabric and/or the bonding agent. This may increase production speed as a shorter compression time, during which the fabric is compressed in-between the external surface and the abutting surface, may be used. The guiding mechanism may comprise a third thermometer, in order to ensure that a suitable temperature, that is neither too high, nor too low, is set.

The guiding mechanism may comprise a first guiding surface and a second guiding surface arranged in a V-shaped configuration. The first and/or the second guiding surface may be essentially flat. A V-shaped configuration is understood as any configuration in which the first and the second guiding surfaces are arranged at an angle between 5° and 150°, or in some embodiments, between 20° and 120°, which may help to pre-fold the bonding agent around the fabric.

The heat-press system may further comprise at least one control unit to control the temperature of the first, second (if present), and/or third (if present) heating element. For example, a first control unit may control the temperature of the first heating element, a second control unit may control the temperature of the second heating element, and a third control unit may control the temperature of the third heating element. Alternatively, a single control unit may control the temperature of all three heating elements. Accurately controlling the temperature of the heating elements may prevent damage to the fabric and/or may prevent any meltable material, for example, the bonding agent and/or the meltable yarn, from sticking to the heat-press system. On the other hand, the temperature may be controlled to be sufficiently high in order to melt the bonding agent and/or the meltable yarn. For example, the least one control unit may allow the temperature of the first roll, the second roll, and/or the guiding mechanism to be controlled to better than 1° C. precision or in some embodiments, better than 0.5° C. precision.

The heat-press system may be used for sealing an edge of a fabric. The heat-press system may be particularly useful for sealing the edge of a fabric, e.g., a cutting edge, since it allows the fabric to be compressed and heated in a single process step, thus simplifying the production and reducing the likelihood of errors due to misalignment.

Sealing the edge of the fabric may comprise the use of a hotmelt, a ribbon, or a seam tape. A seam tape and/or a ribbon may comprise a hotmelt. A seam tape is configured to fit around the edge of a seam in order to allow the seam to be sealed. This allows a precise and localized bond to be achieved.

Some embodiments further concern a method of treating a fabric for an article of footwear or apparel, comprising applying a bonding agent, which melts or softens upon application of heat, to the fabric and/or incorporating a meltable yarn into the fabric, and feeding the fabric into the heat-press system.

A bonding agent may be any material that melts or softens upon application of heat, in some embodiments, at less than 200° C., or in some embodiments, at less than 150° C. For example, a hotmelt or a metal or metal alloy with a low melting temperature, for example, an alloy comprising tin, is a bonding agent. A meltable yarn may be incorporated by any known method, for example, stitching, knitting, weaving, etc.

The present method offers a reduced number of process steps and thus a reduced complexity compared to methods known in the art. Furthermore, the production time may also be reduced compared to techniques known in the art.

The feeding of the fabric into the heat-press system according to some embodiments may comprise: heating at least a first portion the fabric and/or the bonding agent by heating at least one of the first, second (if present), or third (if present) heating element, and compressing at least a second portion of the fabric in the compression zone. The first portion and the second portion may overlap partially or entirely. Therefore, the benefits of the heat-press system described herein are fully exploited.

The bonding agent and/or the meltable yarn may comprise a thermoplastic polymer. For example, the bonding agent and/or the meltable yarn may comprise thermoplastic polyurethane, which has excellent adhesive properties and is non-toxic.

The bonding agent may have the shape of a seam tape, a ribbon, or a film. The shape allows a particularly simple and accurate placement of the bonding agent on the fabric. The placement may be performed by an automated setup, such as a patch-placement machine.

The bonding agent may be applied to an edge of the fabric. This may help to prevent fraying and tearing, which might otherwise result at the edge of the fabric due to loose-cut fibers or yarns. For example, applying a ribbon may comprise folding the ribbon over the cut edge.

The fabric may be for an upper of an article of footwear. For example, the bonding agent may be used around the collar opening of an upper for an article of footwear. The collar opening is subject to significant stresses during exercise, and therefore the method according to some embodiments, not only prevents fraying, but may also increase the bending stiffness of the upper around the collar opening, thus increasing stability.

Some embodiments further concern an article of footwear or apparel comprising a fabric produced by a method described herein. An article of footwear may be any shoe, especially a sports shoe, such as a football boot, a running shoe, a basketball boot, a golf shoe, tennis shoe, hiking shoe, a hiking boot, etc. An apparel may be any type of apparel, especially sports apparel, for example, a shirt, a jersey, shorts, trousers, a cap, etc. An article of footwear or apparel produced by a method according to some embodiments is less prone to manufacturing defects such as inaccurately aligned sealing elements, e.g., hotmelt patches, than those known in the art. As a result, an article of footwear or apparel according to some embodiments is also more durable than those known in the art.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In the following only some embodiments of the invention are described in detail. It is to be understood that these exemplary embodiments may be modified in a number of ways and combined with each other whenever compatible and that certain features may be omitted in so far as they appear dispensable.

Figure 1B:
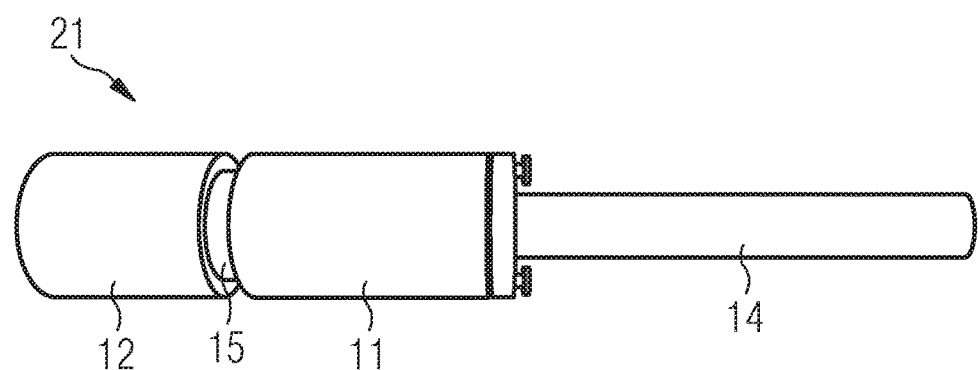

FIGS. 1A-B show a heat-press system 21 for use in the production of footwear or apparel, comprising: at least a hollow first roll 11 comprising an external surface 12 and an internal surface 19, the internal surface 19 defining a core 16, wherein the core 16 comprises a first heating element 13.

In this example, the external surface 12 is essentially cylindrical.

The first roll 11 comprises a material with a thermal conductivity greater than 10 W/mK. at 273.15 K and at a pressure of 1 bar, also known as standard temperature and pressure (STP). The first roll 11 comprises stainless steel.

The first core 16 extends over more than 50% of a length of the first roll. The first roll 11 is attached to a separate mount 14, which is to facilitate mounting the first roll 11 in a heat-press system 21 as described with reference to FIGS. 2 and 4.

The first heating element 13 comprises a first electrically-conducting wire, wound up as a coil, which comprises the first electrically-conducting wire. In this example, the wire comprises an alloy comprising about 55% copper, 44% nickel, and 1% manganese, sometimes also referred to as Constantan® or Konstantan®. The electrically-conducting wire comprises an electrical insulation with a thermal conductivity greater than 5 W/mK. In this example, the electrical insulation is applied as a coating on the electrically-conducting wire. This arrangement is particularly space-efficient.

The electrical insulation comprises a magnesium oxide, which allows a particularly high thermal conductivity, between 45 and 60 W/mK, therefore allowing a particularly good thermal contact between the first heating element 13 and the external surface 12.

The external surface 12 of the first roll 11 comprises a first circumferential groove 15.

FIGS. 1A-B show an example in which the electrical insulation is only applied as a coating on the electrically-conducting wire.

Figure 1C:
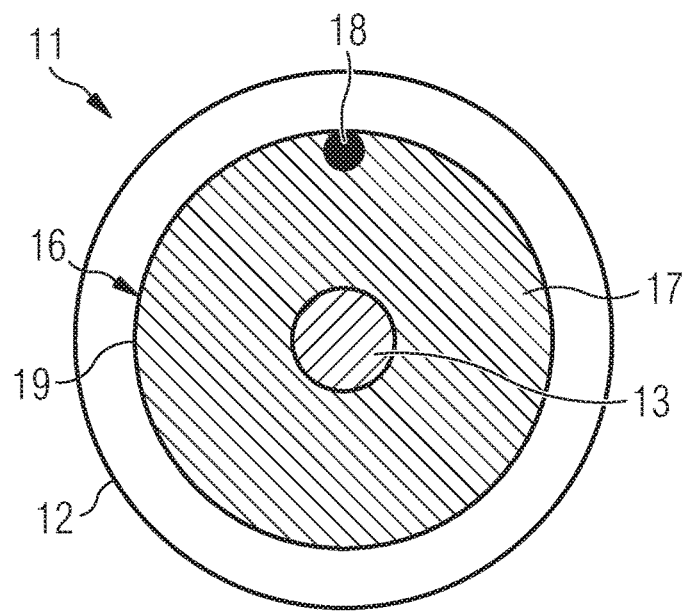

FIG. 1C shows a cross-section of a first roll 11 according to some embodiments. The first roll 11 comprises an external surface 12 and an internal surface 19 configured to form a first core 16. The first core 16 comprises a heating element 13. In this example, the first core 16 comprises an electrically insulating but thermally conducting filler material 17, which fills substantially the entire available volume in the core 16. The filler material 17 takes up more than 40% of the volume of the core 16.

The first roll 11 further comprises a first thermometer 18, arranged between the first heating element 13 and the first core 16. The first thermometer 18 is detachable to allow easy replacement of broken thermometers. In this example, a thermocouple is used as first thermometer 18.

Figure 2A:
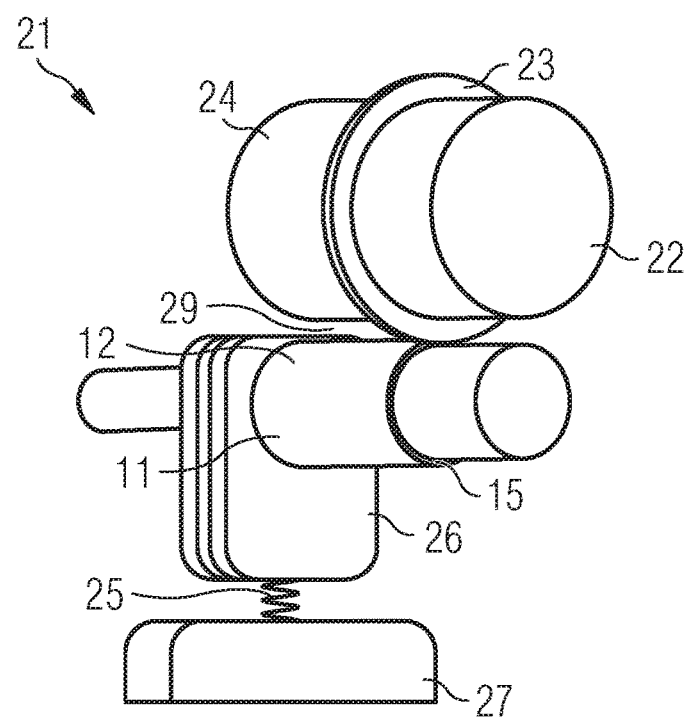
FIG. 2A-B show elements of a heat-press system according to some embodiments.
Figure 2B:
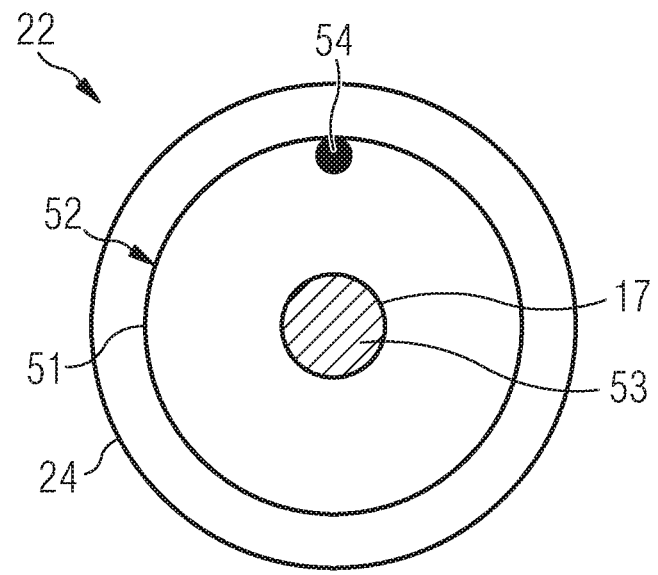

FIG. 2 shows another exemplary heat-press system 21 according to some embodiments. FIG. 2A shows the general arrangement of the heat-press system 21, while FIG. 2B shows a cross-section of the second roll 22.

As shown in FIG. 2A, the heat-press system 21 is for use in the production of footwear or apparel and comprises: a hollow first roll 11 comprising an external surface 12 and an internal surface (not shown), the internal surface defining a core (not shown), wherein the core comprises a first heating element.

The heat-press system 21 further comprises an abutting surface 24 configured to form a compression zone 29 with the external surface 12 of the first roll 11 for compressing a fabric for an article footwear or apparel (not shown).

The external surface 12 of the roll 11 is coupled to a biasing mechanism 25. In this example, the biasing mechanism 25 allows an essentially-linear displacement. However, in other examples, the biasing mechanism 25 may allow a rotary displacement. The biasing mechanism 25 comprises a spring, which is attached to a base 27. Alternatively, or additionally, a rubber pad and/or rubber shock may be used.

The heat-press system 21 further comprises a second roll 22. The second roll 22 comprises an external surface 24, and the external surface 24 forms the abutting surface 24 of the heat press system.

FIG. 2B shows a cross-section of the second roll 22. The second roll 22 further comprises an internal surface 51, the internal surface 51 defining a second core 52, the second core 52 comprising a second heating element 53 and a second thermometer 54.

The second heating element 53 comprises a second electrically-conducting wire, wound up as a coil, which comprises the second electrically-conducting wire. The second electrically-conducting wire comprises an insulation applied as a coating. Unlike in the example shown in FIG. 1C, the second core 52 does not comprise a filler material. It is, however, possible that the second core also comprises a filler material. Likewise, it is also possible the first core shown in FIG. 1C does not comprise a filler material.

Returning to FIG. 2A, the first roll 11 comprises a groove 15 and the abutting surface 24 comprises a corresponding projection 23, wherein the projection 23 is configured to be inserted into the groove 15 when the first roll 11 and the abutting surface 24 abut. In other examples, the first roll 11 may not comprise a groove while the abutting surface 24 still comprises a projection, or vice versa. It is also possible that the first roll 11 comprises a first projection and a second groove and the abutting surface 24, e.g. the second roll, comprises a first groove corresponding to the first projection and a second projection corresponding to the second groove. In this example, the projection 23 is arranged to circumferentially extend around the second roll 22, while the groove 15 is arranged to circumferentially extend around the first roll 11. The groove 15 therefore forms a path for the fabric and/or the bonding agent to pass through.

Figure 3A:
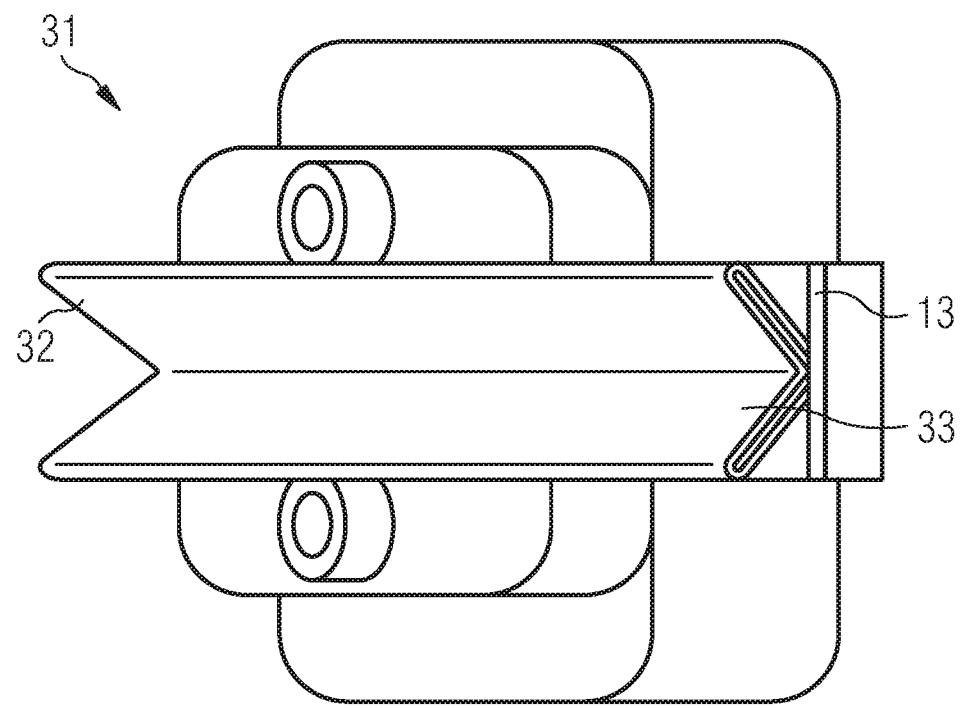
FIGS. 3A-3B show a guiding mechanism for a heat-press system according to some embodiments.
Figure 3B:
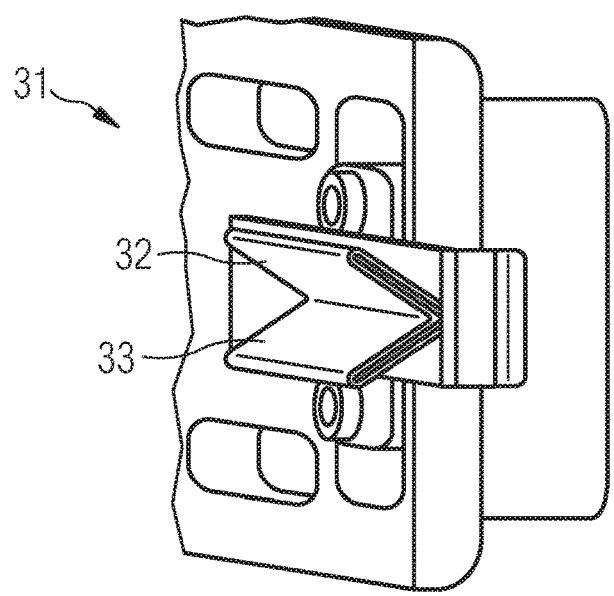

FIGS. 3A and 3B show an example of a guiding mechanism 31 for a heat-press system 21 according to some embodiments.

The guiding mechanism 31 guides a fabric toward the compression zone 29 located between the external surface 12 and the abutting surface 24. The guiding mechanism 31, or feeder, may be used to ensure that a bonding agent is correctly aligned before being arranged on the fabric, for example, the edge of the fabric or a fiber, and before the fabric and/or bonding agent enters the compression zone 29.

The guiding mechanism 31 comprises a material with a thermal conductivity greater than 10 W/mK. In this example, the guiding mechanism 31 comprises stainless steel.

In the example of FIG. 3A, the guiding mechanism 31 comprises a third heating element 13. Therefore, the guiding mechanism 31 may pre-heat the fabric and/or the bonding agent. In the example of FIG. 3B, the guiding mechanism 31 does not comprise a heating element.

The guiding mechanism 31 comprises a first guiding surface 32 and a second guiding surface 33 arranged in a V-shaped configuration. In the example of FIG. 3A, the guiding surfaces are longer than in the example of FIG. 3B. The first 32 and/or the second 33 guiding surfaces are essentially flat in both examples.

Figure 4:
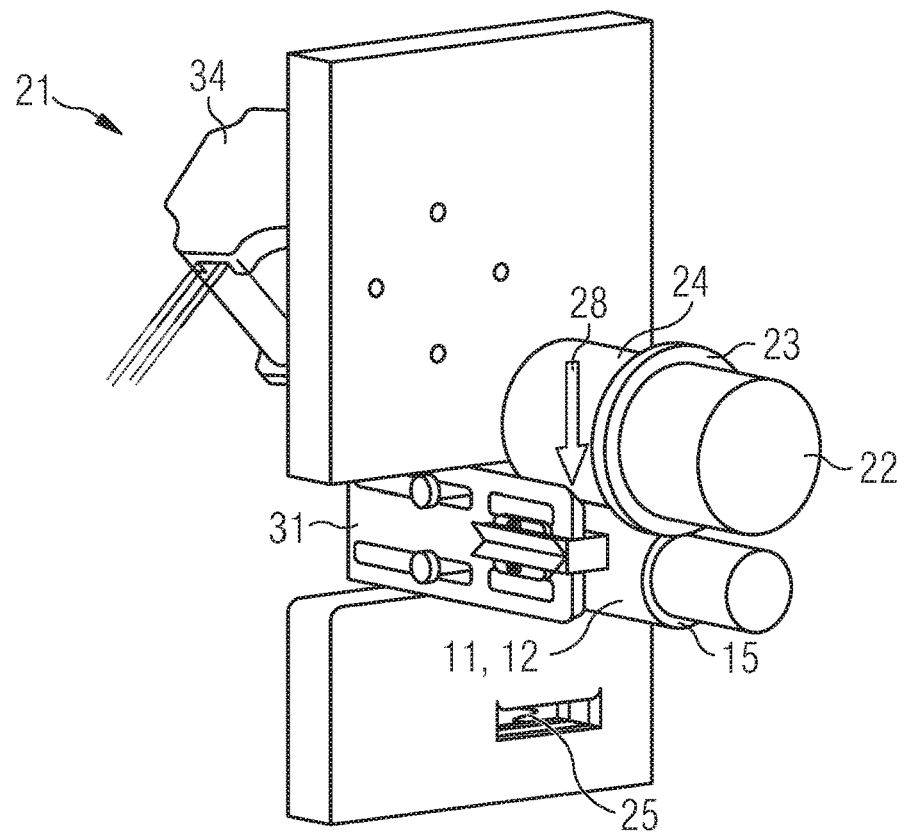
FIG. 4 shows a heat-press system according to some embodiments.

FIG. 4 shows another example of a heat-press system 21 according to some embodiments.

The heat-press system 21 is similar to the heat-press system 21 described with reference to FIG. 2 but additionally comprises a guiding mechanism 31, for example, as described with reference to FIGS. 3A-B. An opening of the V-shaped guiding surfaces of the guiding mechanism 31 aligns along a vertical direction. The arrow labelled with reference numeral 28 indicates the direction in which a fabric to which a bonding agent may have been applied would be inserted into the heat-press.

The exemplary heat-press system 21 further comprises a motor and control unit 34. In this example, the second roll 22 is rotatable about a second axis by the motor. Alternatively, a first motor may be used to rotate the first roll 11 and a second motor may be used to rotate the second roll 22. The control unit 34 controls the temperature of the first and the second heating element. The control unit 34 allows the temperature of the first roll 11 and the second roll 22 to be controlled to better than 0.5° C. precision.

Figure 5A:
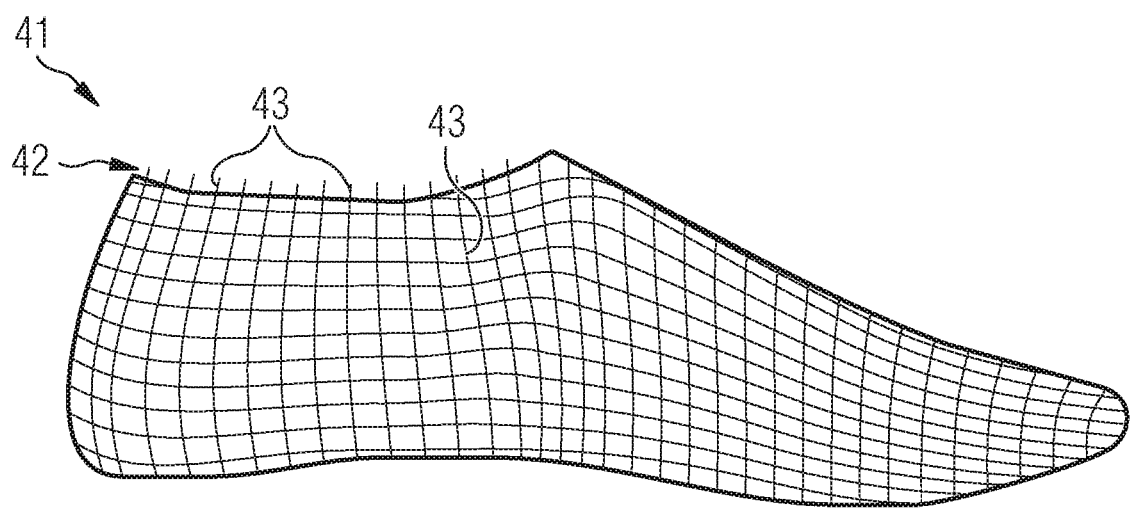
FIGS. 5A-B illustrate a method according to some embodiments.
Figure 5B:
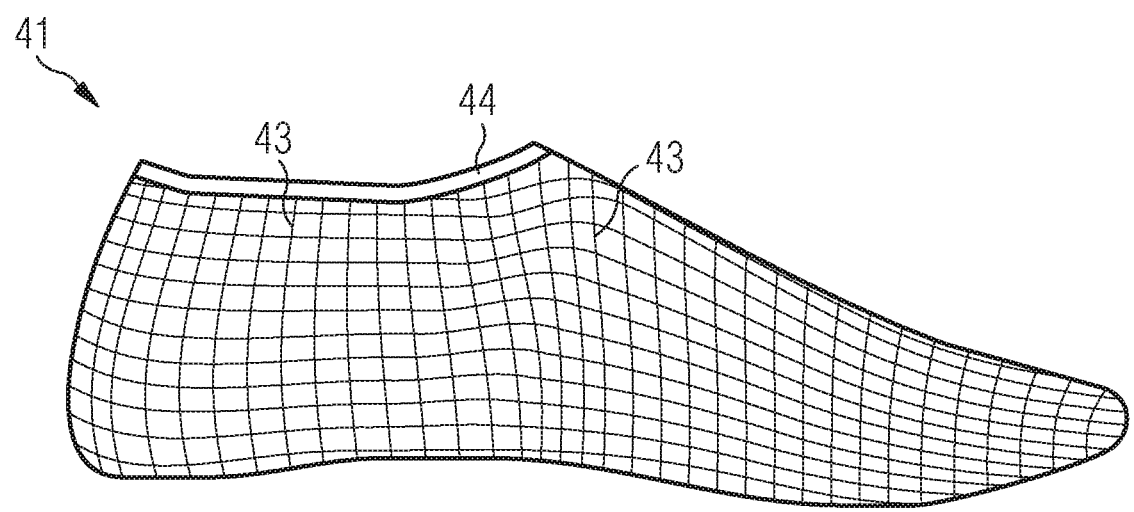

FIGS. 5A-B illustrate a method according to some embodiments. FIG. 5A shows a fabric for an upper 41 of an article of footwear. The upper 41 comprises a plurality of yarns 43. Some the yarns are loose around the collar opening 42 of the upper, due to previous processing steps such as cutting.

In FIG. 5B, a seam tape comprising a bonding agent 44, which melts or softens upon application of heat, has been applied. The melting temperature of the exemplary bonding agent is about 130° C. In this example, the bonding agent 44 is a hotmelt. The bonding agent comprises thermoplastic polyurethane, which has excellent adhesive properties and is non-toxic.

The shoe upper with the bonding agent applied will then be fed into the heat-press system 21 described herein in order to seal the collar opening.

Figure 6:
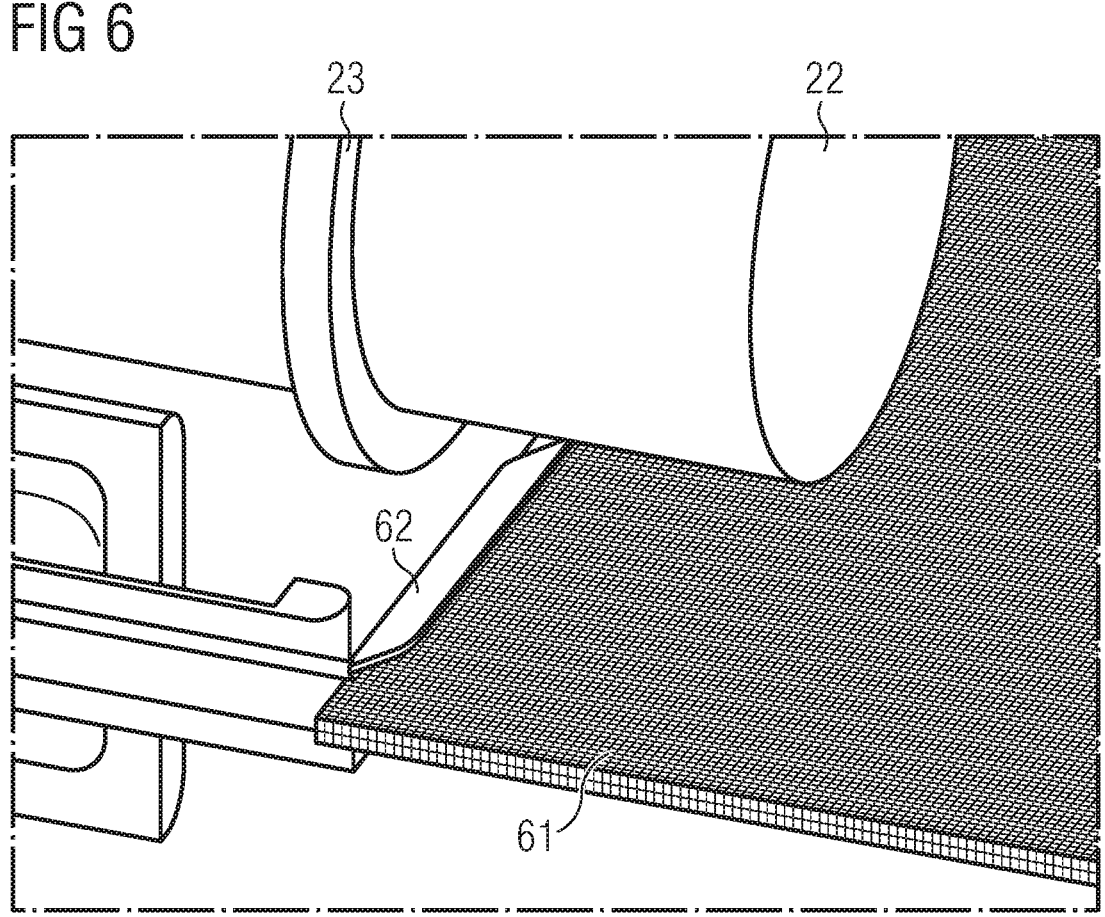
FIG. 6 shows consolidation of a seam by a method and apparatus including the use of a seam tape according to some embodiments.

FIG. 6 shows the consolidation of a seam by a method and apparatus including the use of a seam tape according to some embodiments.

In particular, FIG. 6 shows how a piece of fabric 61 is fed into the heat-press system according to some embodiments. A seam tape 62 has been applied to an edge of the fabric 61. The seam tape is arranged such as to be pressed by projection 23 of the second roll 22 into a corresponding groove in the first roll (not shown). This allows the seam tape 62 to be held firmly in place while pressure and heat are being applied in order to prevent an unintended misalignment of the seam tape 62.

In the following, further examples are described to facilitate the understanding of the invention:

Example 1

A heat-press system (21) for use in the production of footwear or apparel, comprising:
at least a hollow first roll (11) comprising an external surface (12) and an internal surface (19), the internal surface (19) defining a core (16), wherein the core (16) comprises a first heating element (13).

Example 2

The heat-press system (21) of claim 1 further comprising an abutting surface (24) configured to form a compression zone (29) with the external surface (12) of the first roll (11) for compressing a fabric for an article footwear or apparel.

Example 3

The heat-press system (21) according claim 2, wherein the external surface (12) of the roll (11) and/or the abutting surface (24) is coupled to a biasing mechanism (25).

Example 4

The heat-press system (21) according to claim 3, wherein the biasing mechanism (25) comprises a spring.

Example 5

The heat-press system (21) according to one of claims 2-4, comprising a second roll (22), wherein the second roll (22) comprises an external surface (24), and wherein the external surface (24) forms the abutting surface (24) of the heat press system.

Example 6

The heat-press system (21) according to claim 5, wherein the second roll (22) further comprises an internal surface (51), the internal surface (51) defining a second core (52), the second core (52) comprising a second heating element (53).

Example 7

The heat-press system (21) according to one of claims 2-6, wherein at least one of the first roll (11) and the abutting surface (24) comprises a projection (23).

Example 8

The heat-press system (21) according to claim 7, wherein the other one of the first roll (11) and the abutting surface (24) comprises a groove (15),
and wherein the projection (23) is configured to be inserted into the groove (15) when the first roll (11) and the abutting surface (24) abut.

Example 9

The heat-press system (21) according to one of claims 5-8, further comprising at least one motor, wherein the first roll (11) is rotatable about a first axis and/or the second roll (22) is rotatable about a second axis, by means of the motor.

Example 10

The heat-press system (21) according to one of claims 2-9, further comprising a guiding means (31) to guide a fabric for a piece of footwear or apparel toward the compression zone (29) located between the first roll (11) and the abutting surface (24).

Example 11

The heat-press system (21) according to claim 10, wherein the guiding means (31) comprises a third heating element (13).

Example 12

The heat-press system (21) according to one of claim 10 or 11, wherein the guiding means (31) comprises a first guiding surface and a second guiding surface arranged in a V-shaped configuration.

Example 13

The heat-press system (21) according to one of claims 1-12, further comprising at least one control unit to control the temperature of the first (13), second (53), and/or third heating element.

Example 14

The heat-press system (21) according to one of claims 1-13, wherein the heat-press system is for sealing an edge of a fabric.

Example 15

The heat-press system (21) according to one of claims 1-14, wherein sealing the edge of the fabric comprises the use of a hotmelt, a ribbon, or a seam tape.

Example 16

A method of treating a fabric for an article of footwear or apparel, comprising
(a) applying a bonding agent (44), which melts or softens upon application of heat, to the fabric and/or incorporating a meltable yarn into the fabric, and
(b) feeding the fabric into the heat-press system according to one of claims 1-14.

Example 17

The method according to claim 16, wherein the feeding comprises:
(c) heating at least a first portion the fabric and/or the bonding agent by heating at least one of the first (13), second (53), or third heating element, and
(d) compressing at least a second portion of the fabric in the compression zone.

Example 18

The method according to claim 16 or 17, wherein the bonding agent (44) and/or the meltable yarn comprises a thermoplastic polymer.

Example 19

The method according to one of claims 16-18, wherein the bonding agent (44) has the shape of a seam tape, a ribbon or a film.

Example 20

The method according to one of claims 16-19, wherein the bonding agent (44) is applied to an edge (42) of the fabric.

Example 21

The method according to one of claims 16-20, wherein the fabric is for an upper (41) of an article of footwear.

Example 22

An article of footwear or apparel comprising a fabric produced by a method according to one of claims 16-21.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A system for the production of footwear, comprising:
a heat press system arranged to receive a shoe upper, the shoe upper having a cut edge on fabric along a collar opening in the shoe upper, the shoe upper further having seam tape applied on the fabric at the cut edge along the collar opening in the shoe upper, the seam tape comprising a hotmelt material, the heat press system comprising:
a hollow first roll comprising an external surface and an internal surface, the first roll projecting outwardly and sized for receipt thereabout of the collar opening in the shoe upper;
a core defined by the internal surface, wherein the core comprises a first heating element;
a second roll arranged such that respective axes of rotation of the first roll and the second roll are parallel to one another, the second roll having a larger diameter than the first roll and defining an abutting surface configured to form a compression zone with the external surface of the first roll for compressing the seam tape against the fabric of the shoe upper;
a projection within the compression zone and arranged to circumferentially extend at least partially around one of the first roll or the abutting surface; and
a groove within the compression zone and arranged to circumferentially extend fully around the other one of the first roll and the abutting surface;
wherein the projection is configured to be inserted into the groove when the first roll and the a butting surface a but; and
wherein a guiding mechanism located adjacent the first and second rolls is configured to fold the seam tape around the cut edge of the fabric and is arranged for feeding the cut edge of the fabric with the folded seam tape through the compression zone between the projection and groove to simultaneously apply heat and pressure for bonding together the seam tape with the cut edge of the fabric forming a finished edge that prevents fraying due to loose cut fibers or yarns along the collar opening in the shoe upper.

2. The system according claim 1, wherein at least one of the external surface of the first roll or the abutting surface is coupled to a spring or a biasing mechanism.

3. The system according to claim 1, wherein the second roll further comprises a second internal surface, the second internal surface defining a second core, the second core comprising a second heating element.

4. The system according to claim 1, further comprising at least one motor configured to rotate at least one of the first roll about a first axis or the second roll about a second axis.

5. The system according to claim 1, wherein the guiding mechanism comprises a third heating element.

6. The system according to claim 1, wherein the guiding mechanism comprises a first guiding surface and a second guiding surface arranged in a V-shaped configuration.

7. The system according to claim 1, further comprising at least one control unit to control the temperature of at least one heating element of the heat-press system.

8. The system of claim 1, wherein the projection is arranged to circumferentially extend fully around said one of the first roll or the abutting surface.

9. The system of claim 1, wherein the projection comprises an unbroken projection.

10. The system of claim 1, wherein the projection is free of recesses therein.

11. A system for the production of footwear, comprising:
- a heat press system arranged to receive a shoe upper, the shoe upper having a cut edge on fabric along a collar opening in the shoe upper, the shoe upper further having seam tape applied on the fabric at the cut edge along the collar opening in the shoe upper, the seam tape comprising a hotmelt material, the heat press system comprising:
- a hollow first roll comprising an external surface and an internal surface, the first roll projecting outwardly and sized for receipt thereabout of the collar opening in the shoe upper;
- a core defined by the internal surface, wherein the core comprises a first heating element;
- a second roll arranged such that respective axes of rotation of the first roll and the second roll are parallel to one another, the second roll having a larger diameter than the first roll and defining an abutting surface configured to form a compression zone with the external surface of the first roll for compressing the seam tape against the fabric of the shoe upper;
- a projection within the compression zone and arranged to circumferentially extend fully around one of the first roll or the abutting surface; and
- a groove within the compression zone and arranged to circumferentially extend at least partially around the other one of the first roll and the abutting surface;
- wherein the projection is configured to be inserted into the groove when the first roll and the a butting surface a but; and
- wherein a guiding mechanism located adjacent the first and second rolls is configured to fold the seam tape around the cut edge of the fabric and is arranged for feeding the cut edge of the fabric with the seam tape through the compression zone between the projection and groove to simultaneously apply heat and pressure for bonding together the seam tape with the cut edge of the fabric forming a finished edge that prevents fraying due to loose cut fibers or yarns along the collar opening in the shoe upper.

12. The system of claim 11, wherein the groove is formed by bounds that are free from protuberances extending out of the groove in the path of the groove.

13. The system of claim 11, wherein the groove is an unbroken groove.

14. A system for the production of footwear, comprising:
- a heat press system arranged to receive a shoe upper, the shoe upper having a cut edge on fabric along a collar opening in the shoe upper, the shoe upper further having seam tape applied on the fabric at the cut edge along the collar opening in the shoe upper, the seam tape comprising a hotmelt material, the heat press system comprising:
- a hollow first roll comprising an external surface and an internal surface, the first roll projecting outwardly and sized for receipt thereabout of the collar opening in the shoe upper;
- a core defined by the internal surface, wherein the core comprises a first heating element;
- a second roll arranged such that respective axes of rotation of the first roll and the second roll are parallel to one another, the second roll having a larger diameter than the first roll and defining an abutting surface configured to form a compression zone with the external surface of the first roll for compressing the seam tape against the fabric of the shoe upper;
- a projection within the compression zone and arranged to circumferentially extend at least partially around one of the first roll or the abutting surface; and
- a groove within the compression zone and arranged to circumferentially extend at least partially around the other one of the first roll and the abutting surface;
- wherein the projection is configured to be inserted into the groove when the first roll and the abutting surface abut to form a mating interface within the compression zone in which mating between the first roll and the abutting surface is arranged so that relative to one another (i) the first roll or the abutting surface is substantially always receiving and (ii) the other one of the first roll and the abutting surface is substantially always projecting; and
- wherein a guiding mechanism located adjacent the first and second rolls is configured to fold the seam tape around the cut edge of the fabric and is arranged for feeding the cut edge of the fabric with the seam tape through the mating interface in the compression zone to simultaneously apply heat and pressure for bonding together the seam tape with the cut edge of the fabric forming a finished edge that prevents fraying due to loose cut fibers or yarns along the collar opening in the shoe upper.

15. The system of claim 14, wherein the projection is arranged to circumferentially extend fully around said one of the first roll or the abutting surface.

16. The system of claim 14, wherein the groove is arranged to circumferentially extend fully around said other one of the first roll and the abutting surface.

* * * * *